April 2, 1957 E. DYKE 2,787,695

SNOW DETECTOR

Filed May 6, 1954 2 Sheets-Sheet 1

INVENTOR.

Edwin Dyke

BY Mueller & Aichele

Attys.

Fig. 5
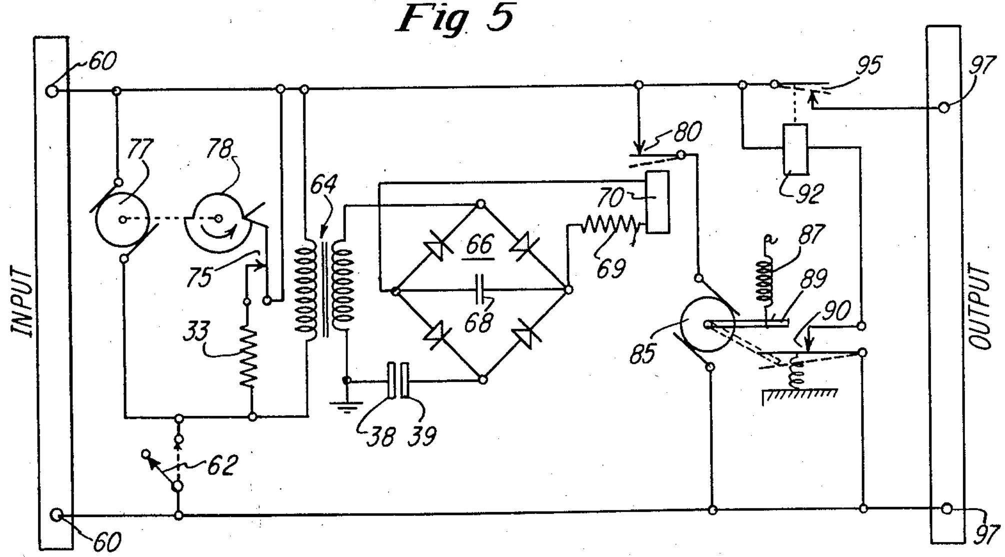
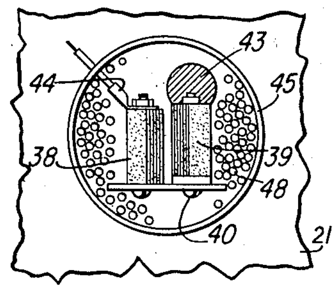
Fig. 4
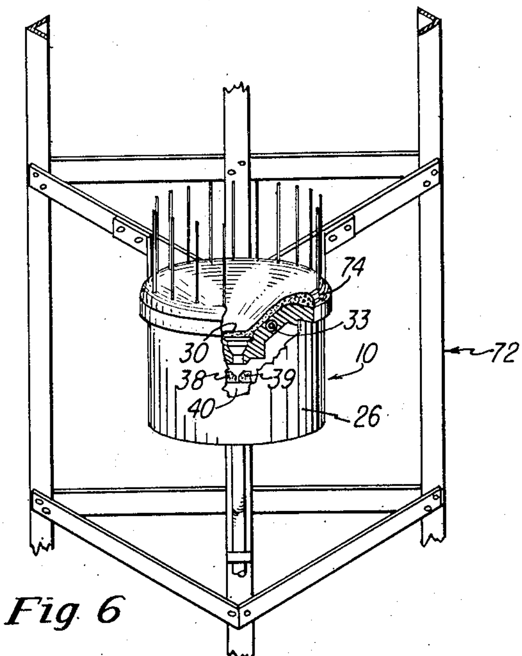
Fig. 6
INVENTOR.
Edwin Dyke
BY
Mueller & Aichele
Attys.

United States Patent Office 2,787,695

Patented Apr. 2, 1957

2,787,695

SNOW DETECTOR

Edwin Dyke, Brookfield, Ill., assignor to Motorola, Inc., Chicago, Ill., a corporation of Illinois Application May 6, 1954, Serial No. 427,919

6 Claims. (Cl. 219—20)

This invention relates to precipitation detecting means and more particularly to a device adapted to detect small amounts of snow and ice and to energize ice thawing equipment or indicator means associated therewith.

There are many applications in which snow detection apparatus may be used to good advantage. One field of use is in the automatic de-icing of an object by operation of heating elements. Illustrations of this would be the operation of heaters to thaw snow or ice on a sidewalk, in railroad switches, on radio antennas, and the like. With such automatic apparatus, it would not be necessary for a person to remain in attendance to operate the heating equipment performing such functions. A second field of utility is to give a remote indication that precipitation has commenced, for example construction crews, road maintenance men, farmers and the like may find such an indication or warning useful.

In the interest of greater utility it may be desirable that snow and ice detecting apparatus be responsive to small amounts of snow or ice, but that it be unresponsive to foreign matter in the air such as dirt, leaves, etc. At the same time to be fully practical such apparatus should be entirely automatic, that is, self-recovering after a snowfall, and be of sturdy construction so as to require a minimum of maintenance. Furthermore, in some applications an additional refinement is the incorporation of means to maintain thawing equipment operative after the cessation of the snow, sheet, or the like in order that it may completely de-ice the object to be cleared.

Apparatus for detecting snow and ice is disclosed and claimed in the copending application of Edwin Dyke and Richard Y. Hoffman, Jr., Serial No. 262,876, filed December 21, 1951, now Patent No. 2,679,004. This application is directed to a different system which solves the above problems and may be preferable to the apparatus of the copending application in certain instances.

It is an object of the present invention to provide an improved snow and ice detector which is responsive to small quantities of precipitation.

Another object of the invention is to provide improved snow and ice detection apparatus which is automatically rendered operative for future detection even after collection of large quantities of snow and ice.

Still another object is to provide improved snow and ice detection apparatus which functions automatically when unattended for indefinite periods and during such periods, requires but a minimum of power for operation.

A further object of the invention is to provide an improved precipitation detector with a controlling device which is operated in response to the presence of snow or ice, and is maintained operative for a predetermined period of time after the cessation of the precipitation.

A feature of the invention is the provision of means to detect the presence of snow and ice and to energize an electric control circuit in the presence thereof which includes a surface for collecting snow and ice, an electric heater associated with the collecting surface to liquefy the snow and ice collected, a timer for periodically energizing the heater so that the snow and ice accumulated is melted and a circuit energized by a small quantity of water.

Another feature is the provision of an improved precipition detection apparatus as described in the preceding paragraph which includes means to become energized only at temperatures at which snow and ice may exist and which incorporates a cycled heating means for melting collected precipitation, thus minimizing power consumption.

Still another feature of the invention is the provision of improved snow and ice detecting apparatus including a circuit to energize ice melting means, a detecting device responsive to the resulting liquid, and regulating means to maintain a control circuit operative for a selected period after being initially energized, thus permitting the continued operation of snow and ice removal equipment to fully perform its function.

Further objects, features, and the attending advantages thereof will be apparent upon considering the following description when taken in conjunction with the accompanying drawings in which:

Fig. 4 is a view of the electrodes taken along the line 4—4 of Fig. 3;

Fig. 5 is a schematic wiring diagram of the apparatus; and

Fig. 6 is a view of the detector secured to a radio antenna tower with snow collected thereon.

The snow and ice detector of the present invention is comprised of a collecting surface to accumulate falling snow or ice, and an electronic circuit to detect the presence thereof when liquefied. Included in the circuit are a heating unit to melt the precipitation collected and a pair of electrodes positioned so that the resulting liquid may pass therebetween to complete an electric circuit which may then energize any desired control circuit. The heating unit has an associated timer so that it is only operative periodically. Thus during a light snowfall the snow may collect for a period determined by the timer before being melted to pass between the electrodes to energize the control circuit. This will insure that a sufficient quantity of liquid is produced to reach the electrodes since some of the liquid will be lost through wetting of the collecting means, evaporation and the like. To conserve power, the entire apparatus may be controlled by a thermostatic switch so that it will operate only when the temperature is such that snow or ice may form.

A second timing device which may be controlled by the energization of the detecting circuit is used to maintain any circuit operated by the detector functioning for a previously selected period after the de-energization of the detector circuit. This may be useful, for example, in snow removal apparatus to maintain its operation for an interval sufficiently long to insure complete thawing.

Figure 1:
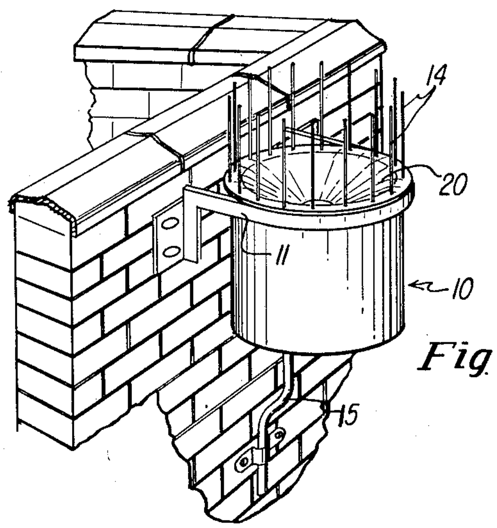
Fig. 1 is a view of the snow and ice detector apparatus supported on the upper portion of the wall of a building.

In Fig. 1, the snow detector 10 is shown supported by a suitable bracket 11 on the outside wall of a building. The location of the device should be selected so that it will best receive any precipitation. Extending from the top of the device are prongs 14 which serve to prevent birds and animals from entering thereupon. A cable 15 is shown extending from the bottom of the device and this may be coupled to any desired equipment as will be explained presently.

Figure 2:
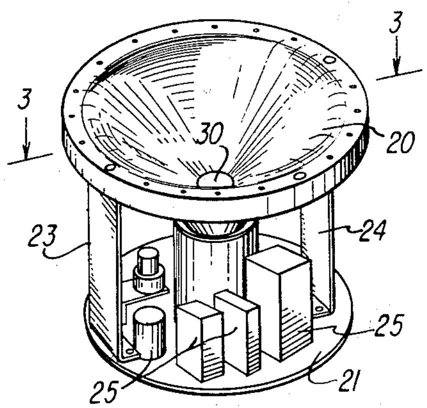
Fig. 2 is a prespective view of the interior of the casing of the detector.
Figure 3:
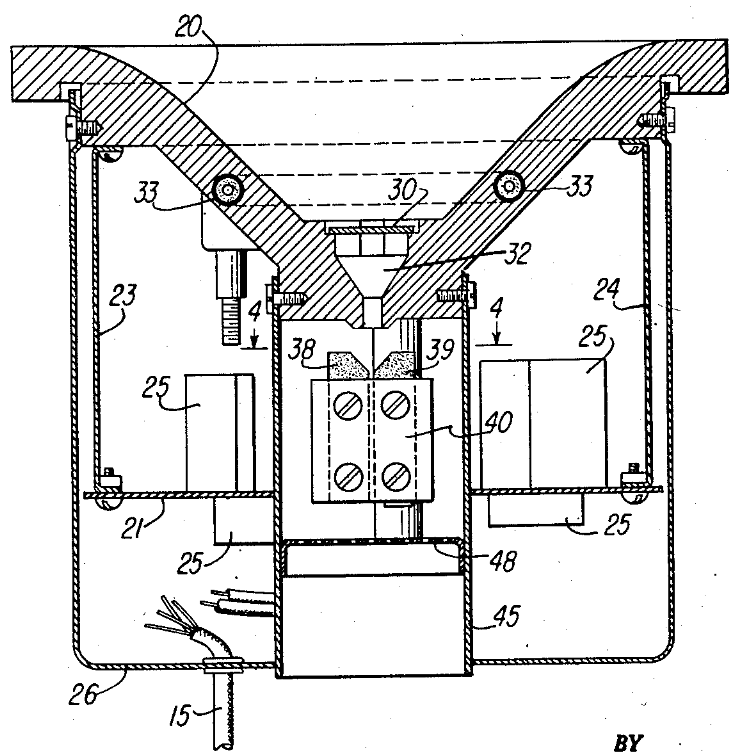
Fig. 3 is a sectional view of the apparatus installed in a suitable housing and taken along the line 3—3 of Fig. 2.

Figs. 2 through 4 illustrate the construction of the interior of the detector, and it may be noted that the structure includes a dish shaped collecting means 20 which supports a base plate 21 by means of two bracket members 23 and 24. The various components 25 included in the circuit of the device may be supported on the top and bottom of the base plate 21. An enclosing casing 26 is shown secured to the collecting means and provides weatherproof protection for the components of the detector. Within the collecting means is a baffle plate 30 which is supported above a funnel-shaped opening 32 in the bottom of the collecting means. At various points around the baffle plate are openings to permit water to enter the funnel-shaped opening 32. However, the baffle plate will exclude larger bits of foreign matter from this opening.

Included within the collecting means 20, which may be a suitable metallic casting, is a heating element 33. When this element is energized, the collecting means will be heated sufficiently to melt any snow or ice collected therein so that the resulting liquid may be funnelled between electrodes 38 and 39. These electrodes are supported immediately below the opening 32 and are insulated from one another so that water passing therebetween will complete a circuit with which these electrodes are associated. The electrodes are supported by the insulating member 40 and one electrode makes contact with the supporting member 43 which may be secured to the metallic casing of the detector so that electrode 39 is grounded to this casing. Electrode 38 has a suitable connecting wire 44 joined thereto.

In order to effectively seal the various components of the circuit used in the detector, a cylindrical shield 45 is secured to a portion of the collecting means and surrounds the electrodes 38 and 39 so that only these electrodes are subjected to the open air and moisture entering through the opening 32. The shield 45 extends out the bottom of the casing 26 and has a perforated bottom plate 48 secured therein below the electrodes. This bottom plate permits the water which has passed between the electrodes to escape from the unit and be dropped through the opening in the bottom of the shield 45. While at the same time it retards the entry of wind which might prevent proper travel of the liquid between the electrodes. Therefore, it may be seen that the device automatically clears itself to be prepared for further collection of precipitation.

Turning now to Fig. 5, the circuit of the snow and ice detector will be described. The input terminals 60 provide connection to a suitable power source which may be coupled to the unit through cable 15 (Fig. 1). This power may be the conventional 110 volt alternating current source. A thermostatic switch 62 is shown in the input circuit so that input voltage will only be supplied when the temperature falls to a certain value. For example, a temperature of 35° to 40° may be selected for the operational point of this switch since it is unlikely that snow or ice will exist above this temperature range. When switch 62 closes the potential of the source will be applied to the heating unit 33 and to the primary of transformer 64. The potential from the secondary of the transformer 64 is applied through the electrodes 38 and 39 to a bridge rectifier circuit 66. The output from the rectifier circuit is filtered by capacitor 68 and resistor 69 and applied across the relay coil 70. When there is no liquid between the electrodes 38 and 39, no potential will be supplied to rectifier circuit 66 and the relay coil 70 will not be energized.

Fig. 6 shows the detector secured to an antenna tower 72 after some snow 74 has been collected in the collecting means. In order to produce liquid from the snow or ice accumulated in the collecting means, the heating element 33 is energized from the potential source through the timing switch 75. The timing switch 75 is controlled by suitable timing means 77 also connected to the voltage source through the switch 62. This timing means will be energized when switch 62 is closed, that is when the temperature reaches a selected point, and will operate the cam device 78 associated therewith. The cam device is constructed to engage switch 75 so that as the cam 78 is operated, the switch 75 will be alternately closed and open.

The timing means 77 and its associated cam device 78 are selected to provide a cycle of operation which will be most suitable for the weather conditions existing where the unit is installed. The selection of the timing cycle will be governed by the fact that it is desired to have the heating element 33 remain de-energized for a period of sufficient time to permit the accumulation of a quantity of snow in the collecting means 20 during a light snowfall. Then the switch 75 will be closed and this collected snow may be melted to energize the rectifier circuit by completing the connection between the electrodes 38 and 39. Snow must be allowed to accumulate for a long enough period that when the heating unit is energized enough liquid is produced that despite losses due to evaporation, sublimation, wetting of the snow collecting means, and the like, enough liquid is provided to bridge the electrodes and energize the controlling relay. However, if the period before energization of heating element 33 is too great, during a severe snowfall too much snow may accumulate on the article to be cleared so that its operation may be impaired. For example, this could be the case when the detector is to control the heater for a radio antenna, in which case enough snow might accumulate to impair the system if the heating means were not operated soon enough after the start of severe snowfall. A cycle of one-half hour on and one-half hour off has been found satisfactory for some applications.

When snow or ice in the collecting means is wetted and liquid falls between the electrodes 38 and 39, relay coil 70 is energized and the normally closed contacts 80 thereof will be opened to break the connection of the input potential of a second timing means 85. The timing means 85 includes an arm or lever 89 which operates to open normally closed contacts 90. With the potential removed from the timing means 85, spring 87 moves lever 89 to a position out of engagement with the contact of switch 90, thereby permitting the contacts of this switch to close. When switch 90 is closed, the connection of relay coil 92 is completed across the input potential terminals 60. Associated with the relay coil 92 are contacts 95 which are connected so that energization of this relay will apply the input potential across the output terminals 97. Any suitable apparatus or indicator means may be connected across these terminals to perform a desired function when precipitation occurs.

The construction of timing means 85 which may be model SXR342 of the Cramer Manufacturing Company, Centerbrook, Conn., is such that when no potential is supplied thereto, lever arm 89 will be held by spring 87 in a position out of engagement with the contact of switch 90. However, when liquid is no longer present between the electrodes 38 and 39 and the relay coil 70 is therefore deenergized so that the contacts 80 thereof close, the timing means 85 is energized and will cause the lever arm 89 to rotate and open switch 90. A substantial interval of time may be required for the arm 89 to rotate from the position shown in solid lines to the position which opens the contacts 90. This will hold the output terminals energized for the interval provided. This interval may be selected in accord with the nature of the equipment connected across output terminals 97. When small articles are to be thawed by rather large heating means, a short period will be all that is required, whereas, when articles of considerable size must be thawed in an area of frequent heavy snowfall, it may be desired that the interval before which timing means 85 opens switch 90 will be long and might be half a day or more. In most applications it will be desirable that the timing means 85 provides an interval greater than the time required for a complete cycle of the cam 78. Therefore, during a continuous snowfall, once relay coil 70 is energized the output terminals would be continually energized even though the heating means 33 is only periodically energized to produce liquid between the electrodes 38 and 39. Furthermore if there is only a light snowfall so that the circuit with the electrodes is completed for only a short time, it may be desirable that the output circuit remain energized in the case of some applications. With the timing means 77 and 85 arranged in this way, the output circuit will be energized at all times during a snowfall and for a selected period after the cessation of the snowfall. Various other timing means could also be used for certain applications, for example a timer which would only operate if the circuit connected thereto were energized for a given period might be useful in operating thawing equipment only after a snowfall of considerable size.

The apparatus of the present invention provides, therefore, an improved precipitation detector and control which may be installed to control from a remote point indicator or removal equipment, and which may be left unattended throughout all types of weather since it is completely automatic. The power consumption will be low since the apparatus may become energized only below a selected temperature and will then intermittently consume power for the detector heating means. Furthermore, the device will detect even a slight snowfall and when used with removal or thawing equipment, which may require some time to fully perform after a large snowfall, additional timing means may be incorporated to permit this complete operation.

While a particular embodiment of the invention has been shown and described, it is understood that changes may be made and it is intended to cover in the appended claims all such changes and modifications as fall within the scope of the invention.

What is claimed is:

1. Precipitation detection apparatus including in combination, dish-shaped precipitation collecting means having electrical heating means associated therewith to liquefy solid precipitation collected, said collecting means having an opening therein to conduct liquid therefrom, an electric circuit including spaced electrodes disposed adjacent said opening and adapted to be completed by the passage of liquid from said opening between said electrodes, completion of said electric circuit providing a desired operation in response to detected precipitation, power supply means, and timing means adapted to be operative in the presence and absence of precipitation, said timing means connecting said power supply means to said heating means to alternately render the same operative and inoperative, whereby a quantity of precipitation may be collected in said collecting means before operation of said heating means, and said heating means causes the precipitation collected to be liquified to complete said circuit indicating the presence of precipitation.

2. Snow and ice detection apparatus including in combination, precipitation collecting means having an opening therein to conduct liquid therefrom, electrical heating means associated with said collecting means to liquefy solid precipitation collected, a first electric circuit including potential supply means and thermostatic switch means for energizing said circuit when the temperature falls below a predetermined value, timing means connecting said first electric circuit to said heating means to periodically render the same operative, whereby a quantity of snow or ice may be collected in said collecting means before the same is heated to liquefy the precipitation collected, a second electric circuit connected to said first electric circuit and energized thereby, said second electrical circuit including spaced electrodes disposed adjacent said opening in said collecting means so that said second electric circuit is completed by the passage of liquid from said opening between said electrodes, with the completion of said second electric circuit indicating the presence of snow or ice.

3. Snow and ice detection apparatus including in combination, precipitation collecting means having electrical heating means associated therewith to liquefy solid precipitation collected and having an opening therein to conduct liquid therefrom, first timing means connected to said heating means to periodically render the same operative, whereby a quantity of snow or ice may be collected in said collecting means before the same is heated and liquefied, an electric circuit including a pair of spaced electrodes disposed adjacent said opening and adapted to be energized by the passage of liquid from said opening between said electrodes, and an output circuit adapted to be energized by said electric circuit and having second timing means operative to maintain said output circuit energized for a selected interval after said electric circuit is no longer energized.

4. Snow and ice detection apparatus including in combination, precipitation collecting means having electrical heating means associated therewith to liquefy solid precipitation collected thereon and having an opening therein to conduct liquid therefrom, first timing means connected to said heating means to alternately render the same operative for a first time interval and inoperative for a second time interval whereby a quantity of snow or ice may be collected in said collecting means before the same is liquefied, an electric circuit including relay means and a pair of spaced electrodes disposed adjacent said opening in said collecting means, said relay means being adapted to be energized by the passage of liquid from said opening between said electrodes to indicate the presence of snow or ice, and an output circuit including second timing means coupled to said relay means and energized thereby, said second timing means being operative to maintain said output circuit energized for a third time interval after said electric circuit is no longer energized, said third time interval being substantially equal to the sum of said first and second time intervals so that said output circuit is continually energized when precipitation is collected on said collecting means.

5. Apparatus for detecting precipitation and for controlling equipment for handling such precipitation, said apparatus including in combination, precipitation collecting means having heating means associated therewith to liquefy any solid precipitation collected and having an opening therein to conduct liquid therefrom, an input circuit including a thermostatic switch for energizing said circuit at a selected temperature, timing means in said input circuit connected to said heating means to periodically render the same operative when said input circuit is energized whereby a quantity of precipitation may be collected in said collecting means and then liquefied, an electric control circuit connected to said input circuit and energized thereby, said control circuit including spaced electrodes disposed adjacent said opening in said precipitation collecting means and relay means energized by the passage of liquid from said opening between said electrodes, means for controlling equipment for handling precipitation, and additional timing means energized by said relay means to maintain said equipment controlling means energized for a selected interval after operation of said relay means.

6. Apparatus for detecting precipitation including ice and snow and for controlling equipment for handling such precipitation, said apparatus including in combination, precipitation collecting means having heating means associated therewith to liquefy any solid precipitation collected and having an opening therein to conduct liquid from said collecting means, an input circuit including a thermostatic switch for energizing said circuit at a selected temperature, timing means in said input circuit connected to said heating means to periodically render the same operative when said input circuit is energized whereby a quantity of snow or ice may be collected in said collecting means and then liquefied, an electric control circuit including spaced electrodes disposed adjacent said opening in said precipitation collecting means and relay means energized by the passage of liquid from said opening between said electrodes, and additional timing means including contacts for controlling equipment for handling snow and ice, said additional timing means having a first position in which said contacts thereof are open so that the equipment is de-energized, and a second position in which said contacts are closed to energize the equipment, said relay means being connected to said additional timing means for providing operation of the same to said second position when said relay is energized, said additional timing means requiring a predetermined interval for moving from said second position to said first position to hold said contacts closed for said predetermined interval after said relay means is released.

References Cited in the file of this patent

UNITED STATES PATENTS

| | | |
|---|---|---|
| 2,105,925 | Merriam | Jan. 18, 1938 |
| 2,159,186 | Tyler | May 23, 1939 |
| 2,421,166 | Sherlock | May 27, 1947 |
| 2,566,813 | Thorsen | Sept. 4, 1951 |
| 2,640,958 | Davis | June 2, 1953 |
| 2,675,456 | Cleminson et al. | Apr. 13, 1954 |
| 2,679,003 | Dyke et al. | May 18, 1954 |
| 2,717,957 | Ohlheiser | Sept. 13, 1955 |